Patented June 14, 1949

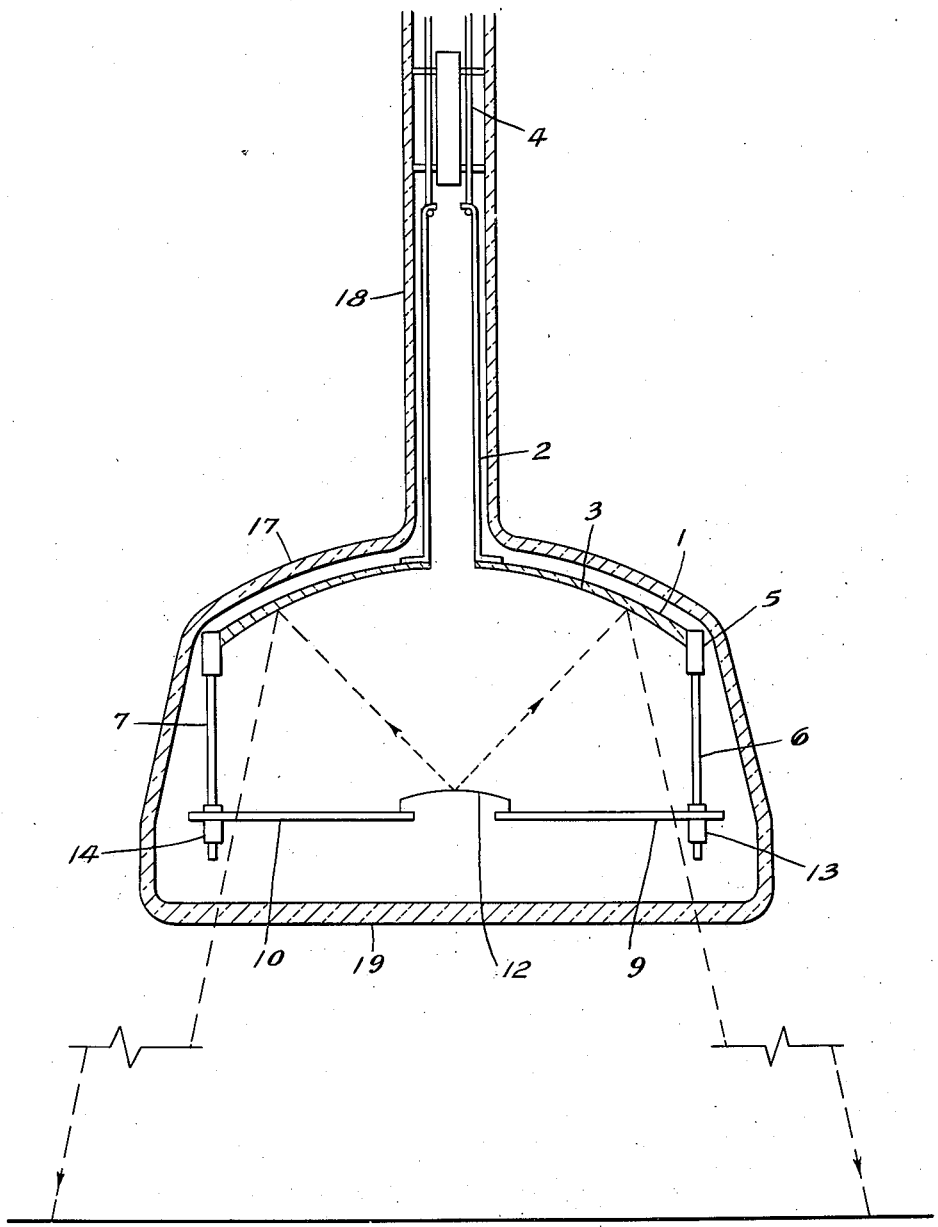

2,473,320

UNITED STATES PATENT OFFICE 2,473,320

CATHODE-RAY TUBE

Arthur Henry Ashford Wynn and Ronald Alfred Hill, London, England, assignors to A. C. Cossor Limited, London, England, a British company Application March 7, 1947, Serial No. 733,153
In Great Britain March 7, 1946

8 Claims. (Cl. 250—164)

This invention relates to cathode ray tubes.

It is sometimes desired to produce an enlarged image upon the display screen of the cathode ray tube, as for example, when a television receiver is to be viewed by a large number of people simultaneously. As the limit to the size of a cathode ray tube is, or at least up to the preesnt has been, set by practical considerations at about 15" for the screen diameter, attempts have been made to project the screen image on to a larger display surface by some form of optical projection. One such arrangement makes use of a small fluorescent screen upon a metal backing plate and a mirror arranged internally of the cathode ray tube to receive the light from the small screen and reflect it through the end wall of the tube on to a larger optical screen. The internal mirror may be spherical, paraboloidal, or of other desired shape. The present invention is concerned with an arrangement of this latter kind and has among its objects to facilitate the production, and especially the quantity production, of such cathode ray tubes. In accordance with the present invention the mirror is carried solely by the electrode structure of the tube.

In accordance with another feature the mirror is integral with the final anode. In accordance with yet another feature the metal plate carrying the fluorescent material and hereinafter referred to for distinctiveness as the object screen, is carried solely by the combined mirror and electrode structure as above described.

An embodiment of the invention will now be described with reference to the accompanying drawing which shows an axial section through a cathode ray tube having a projection system in which the final anode and the mirror are integral with one another.

The concave mirror 1 and final anode 2 were pressed or cast in one piece; the concave surface 3 of the mirror 1 was then suitably finished, as for example, by being plated with rhodium, and the rest of the electrode assembly 4 is completed by direct attachment to the combined mirror 2 and anode 2. The outside edge 5 of the mirror 1 carries three spacers 6, 7 and 8 (8 not shown) having threaded ends thereon which pass through holes in three metal arms 9, 10, and 11 (11 not shown). The other ends of these arms 9, 10 and 11 are attached to the back of the object screen 12 which is afforded support thereby. The threaded ends of the spacers 6, 7 and 8 carry adjusting nuts 13, 14, 15 (15 not shown) so that the position of the object screen 12 relative to the mirror 1 can be adjusted. The object screen 12 is made of nickel or copper and is shaped as part of a spheroid having a radius or curvature approximately equal to the focal length of the mirror 1. The fluorescent coating on the convex surface of the object screen 12 faces toward the oncoming electron beam which strikes the screen centrally in the absence of deflection. When the object screen 12 is correctly located all parts of it are focussed accurately in the plane of the display screen 16. The complete assembly of electrode structure 4, mirror 1 and object screen 12 are located with respect to and supported within the cathode ray tube 17 by having the final anode 2 in the form of a cylinder which is an accurate fit within the neck 18 of the tube 17. The face 19 of the cathode ray tube 17 is flat in order that light rays from the mirror 1 may pass out undeviated.

One of the advantages of the arrangement described is that by having the mirror 1 in continuous metallic connection with the final anode 2 the desired potential gradients within the tube 17 are not disturbed.

It will be understood that the design is such as to enable the parts to be correctly located and, in particular, to enable the mirror 1 to be in correct alignment with the optical axis of the system. The process of aligning the structure accurately can be effected by optical means, for example, by shining a parallel beam of light normally on to the surface of the object screen 12 and focussing it accurately on the display screen 16 placed at the correct distance. The whole can then be placed in the cathode ray tube 17, the necessary connections made to the base, and sealing of the tube completed without any disturbance of the optical alignment.

We claim:

1. A cathode ray tube having an electron beam projecting structure including a final anode and wherein is arranged an internal projection system comprising an object screen having a fluorescent surface thereon, said fluorescent surface facing the oncoming electron beam, and a mirror carried by the electron beam projecting structure of the tube and arranged to reflect light rays proceeding from said object screen upon excitation by the electron beam, through the end wall of the cathode ray tube, said mirror being carried by the final anode of the electrode structure.

2. A cathode ray tube having an electron beam projecting structure including a final anode and wherein is arranged an internal projection system comprising an object screen having a fluorescent surface thereon, said fluorescent surface facing the oncoming electron beam, and a mirror carried by the electron beam projecting structure of the tube and arranged to reflect light rays proceeding from said object screen upon excitation by the electron beam, through the end wall of the cathode ray tube, said mirror being carried by the final anode of the electrode structure, and said object screen being carried solely by the combined mirror and electrode structure.

3. A cathode ray tube having an electron beam projecting structure including a final anode in which a projection system comprises a concave mirror formed integrally with the final anode, spacers attached to the edge of said mirror and carrying metal arms at the ends remote from the mirror and an object screen supported by the said metal arms and having a fluorescent surface thereon facing both the oncoming electron beam and the reflecting surface of the mirror so that light rays received by the mirror from the object screen are projected through the end wall of the cathode ray tube.

4. A cathode ray tube as claimed in claim 3 wherein the object screen is formed as part of a spheroidal metal plate, the radius of curvature of which is substantially equal to the focal length of the said mirror and which carries the fluorescent surface on its convex side.

5. A cathode ray tube as claimed in claim 3 wherein the complete assembly of electrode structure, mirror and object screen is located with respect to and supported within the cathode ray tube by having the final anode in the form of a cylinder which is an accurate fit within the neck of the tube.

6. A cathode ray tube having an electron beam projecting structure, a fluorescent object screen adapted to be struck by a beam of electrons from said beam projecting structure, and a concave mirror, all within an evacuated envelope, said screen and said mirror facing each other and being carried by a single supporting structure within said tube, said concave mirror being electrically connected to and supported by a part of said beam projecting structure.

7. A cathode ray tube having an electron beam projecting structure, a fluorescent object screen adapted to be struck by a beam of electrons from said beam projecting structure, and a concave mirror, all within an evacuated envelope, said concave mirror being electrically connected to, and supported by, an element of said beam projecting structure, and a number of supporting arms attached to the edge of said mirror and supporting said object screen.

8. A cathode ray tube having an electron beam projecting structure, a fluorescent object screen adapted to be struck by a beam of electrons from said beam projecting structure, and a concave mirror, all within an evacuated envelope, said concave mirror being electrically connected to, and supported by, an element of said beam projecting structure, a number of supporting arms attached to the edge of said mirror and supporting said object screen, and means for adjusting the relationship between said mirror and said screen.

ARTHUR HENRY ASHFORD WYNN.
RONALD ALFRED HILL.

REFERENCES CITED

The following references are of record in the file of this patent:

UNITED STATES PATENTS

| Number | Name | Date |
| --- | --- | --- |
| 2,060,825 | Ressler et al. | Nov. 17, 1936 |
| 2,292,979 | Wald | Aug. 11, 1942 |
| 2,299,047 | Winans | Oct. 13, 1942 |
| 2,415,311 | Szegho | Feb. 4, 1947 |
| 2,440,735 | Cawein | May 4, 1948 |

FOREIGN PATENTS

| Number | Country | Date |
| --- | --- | --- |
| 463,891 | Great Britain | Apr. 8, 1937 |
| 487,241 | Great Britain | June 16, 1938 |
| 557,771 | Great Britain | Dec. 3, 1943 |